(12) United States Patent
Peterson et al.

(10) Patent No.: US 10,990,763 B2
(45) Date of Patent: Apr. 27, 2021

(54) BIAS PARAMETERS FOR TOPIC MODELING

(71) Applicant: Oracle International Corporation, Redwood City, CA (US)

(72) Inventors: Daniel Peterson, Broomfield, CO (US); Jean-Baptiste Frederic George Tristan, Burlington, MA (US); Robert James Oberbreckling, Broomfield, CO (US)

(73) Assignee: Oracle International Corporation, Redwood City, CA (US)

( * ) Notice: Subject to any disclaimer, the term of this patent is extended or adjusted under 35 U.S.C. 154(b) by 175 days.

(21) Appl. No.: 16/407,522

(22) Filed: May 9, 2019

(65) Prior Publication Data

US 2020/0279019 A1 Sep. 3, 2020

Related U.S. Application Data

(60) Provisional application No. 62/812,776, filed on Mar. 1, 2019.

(51) Int. Cl.
*G06F 40/30* (2020.01)
*G06N 20/00* (2019.01)
(Continued)

(52) U.S. Cl.
CPC .............. *G06F 40/30* (2020.01); *G06F 16/35* (2019.01); *G06F 40/253* (2020.01); *G06N 5/04* (2013.01); *G06N 20/00* (2019.01)

(58) Field of Classification Search
CPC .... G06F 17/2785; G06F 17/274; G06F 16/35; G06N 20/00; G06N 5/04
See application file for complete search history.

(56) References Cited

U.S. PATENT DOCUMENTS 9,767,414 B2 9/2017 Maruhashi et al.
10,140,281 B2 11/2018 Steele, Jr. et al.
(Continued)

OTHER PUBLICATIONS

Daniel W. Peterson, et al., "Bayesian Verb Sense Clustering", The Thirty-Secon AAAI Conference on Artificial Intelligence (AAAI-18), pp. 1-8.
(Continued)

*Primary Examiner* — Kevin Ky
(74) *Attorney, Agent, or Firm* — Robert C. Kowert; Kowert, Hood, Munyon, Rankin & Goetzel, P.C.

(57) ABSTRACT

Systems and methods are disclosed to improve a topic modeling system that tunes a topic model for a set of topics from a corpus of documents, by allowing users to pre-inform the tuning process with bias parameters for desired associations in the topic model. In embodiments, the topic model may be a Latent Dirichlet Allocation (LDA) model. In embodiments, the bias parameter may indicate a fixed association where a particular word in a particular document is associated with a particular topic. In embodiments, the bias parameter may specify a weight value that biases the inference process with regard to a particular association. Advantageously, the disclosed features allow users to specify a small number of parameters to steer the tuning process towards a set of desired topics. As a result, the topic model may be generated more quickly and with more useful topics.

20 Claims, 10 Drawing Sheets

(51) Int. Cl.
  *G06F 16/35* (2019.01)
  *G06N 5/04* (2006.01)
  *G06F 40/253* (2020.01)

(56) References Cited

U.S. PATENT DOCUMENTS

| | | | |
|---|---|---|---|
| 10,147,044 B2 | 12/2018 | Steele, Jr. et al. | |
| 10,394,872 B2 | 8/2019 | Tristan et al. | |
| 2010/0005061 A1* | 1/2010 | Basco | G06F 16/355 704/9 |
| 2010/0005087 A1* | 1/2010 | Basco | G06F 16/951 707/E17.017 |
| 2010/0153318 A1 | 6/2010 | Branavan et al. | |
| 2012/0089621 A1 | 4/2012 | Liu et al. | |
| 2012/0239668 A1* | 9/2012 | Bhattacharyya | G06F 40/30 707/754 |
| 2013/0297590 A1 | 11/2013 | Zukovsky et al. | |
| 2014/0129510 A1* | 5/2014 | Vladislav | G06K 9/6218 706/52 |
| 2015/0254328 A1* | 9/2015 | Dereszynski | G06Q 30/0277 707/739 |
| 2016/0210718 A1 | 7/2016 | Tristan et al. | |
| 2017/0300966 A1* | 10/2017 | Dereszynski | G06Q 30/0254 |
| 2018/0293505 A1* | 10/2018 | Bouveyron | G06N 5/003 |
| 2018/0300171 A1* | 10/2018 | Qiao | G06N 20/00 |
| 2019/0114319 A1 | 4/2019 | Tristan et al. | |
| 2020/0279019 A1* | 9/2020 | Peterson | G06N 20/00 |

OTHER PUBLICATIONS

Daniel Ramage, et al., "Labeled LDA: A supervised topic model for credit attribution in multi-labeled corpora", Proceedings of the 2009 Conference on Empirical Methods in Natural Language Processing, Aug. 6-7, 2009, pp. 248-256.

Pengtao Xie, et al., "Incorporating Word Correlation Knowledge into Topic Modeling", Human Language Technologies: The 2015 Annual Conference of the North American Chapter of the ACL, May 31-Jun. 5, 2015, pp. 725-734.

Yi Yang, et al., "Efficient Methods for Incorporating Knowledge into Topic Models", Proceedings of the 2015 Conference on Empirical Methods in Natural Language Processing, Sep. 17-21, 2015, Association for Computational Linguistics, pp. 308-317.

David Andrzejewski, et al., "Incorporating Domain Knowledge into Topic Modeling via Dirichlet Forest Priors", Appearing in Proceedings of the 26th International Conference on Machine Learning, 2009, pp. 1-16.

Claire Bonial, et al., "Renewing and revising SemLink", Proceedings of the 2nd Workshop on Linked Data in Linguistics (LDL-2013): Representing and linking lexicons, terminologies and other language data, 2013, pp. 9-17.

Yuening Hu, et al., "Interactive topic modeling", Springer Mach Learn, 2014, pp. 423-469.

Jagadeesh Jagarlamudi, et al., "Incorporating Lexical Priors into Topic Models", Proceedings of the 13th Conference of the European Chapter of the Association for Computational Linguistics, Apr. 23-27, 2012, pp. 204-213.

Simon Lacoste-Julien, et al., "DiscLDA: Discriminative Learning for Dimensionality Reduction and Classification", In Advances in neural information processing systems, pp. 897-904.

Mitchell Marcus, et al., "The Penn Treebank: Annotating Predicate Argument Structure", Proceedings of the workshop on Human Language Technology. Association for Computational Linguistics, 1994, pp. 114-119.

David M. Blei, et al., "Supervised topic models", Advances in neural information processing systems, 2008, pp. 1-8.

Courtney Napoles, et al., "Annotated Gigaword", Proceedings of the Joint Workshop on Automatic Knowledge Base Construction & Web-scale Knowledge Extraction (AKBC-WEKEX), 2012, pp. 95-100.

David M. Blei, et al., "Latent Dirichlet Allocation", Journal of Machine Learning Research 2, 2003, pp. 993-1022.

Claire Bonial, et al., "Renewing and Revising SemLink", In Proceedings of the 2ndWorkshop on Linked Data in Linguistics (LDL-2013): Representing and linking lexicons, terminologies and other language data, pp. 9-17.

Daisuke Kawahara, et al, "A Step-wise Usage-based Method for Inducing Polysemy-aware Verb Classes", Proceeding of the 52nd Annual Meeting of the Association of Computational Linguistics, Jun. 23-25, 2014, pp. 1030-1040.

Daniel W. Peterson, et al., Leveraging VerbNet to build Corpus-Specific Verb Clusters, Proceeding of the Fifth Joint Conference on Lexical and Computational Semantics (SEM2016), Aug. 11-12, 2016, pp. 102-107.

* cited by examiner

```
configuration file 500

# Topic 12 = "US politics"
# Topic 14 = "Washington DC travel"

``` document: "Washington newspaper article" {                                    510 word: "President" => topic: "12",
    word: "Congress" => topic: "12",
    word: "Capitol" => topic: "12",
    word: "visit" => topic: "12"
}, document: "Washington Travel Guide" {                                          520 word: "Capitol" => topic "14",
    word: "Congress" => topic "14",
    word: "visit" => topic "14",
    word: "memorial" => topic "14"
}, word: "election" => topic: "12",                                              530 document: "List of US senator names" => topic: "12"                           540

*FIG. 5*

BIAS PARAMETERS FOR TOPIC MODELING

This application claims benefit of priority to U.S. Provisional Patent Application No. 62/812,776 filed Mar. 1, 2019 and titled "Bias Parameters for Topic Modeling," which is hereby incorporated by reference in its entirety.

BACKGROUND

Field of the Disclosure

This disclosure relates generally to systems and methods for topic modeling in textual data and tuning topic models, and more particularly, to systems and methods for introducing bias parameters to a topic model inference process to influence the topics produced by the process.

Description of the Related Art

Topic modeling is a statistical inference method used to analyze a corpus of documents and to discover which words are correlated, known as topics. Topic modeling may be used in a number of applications, including dimensionality reduction in document classification, feature extraction in natural language processing, and in mixed-membership clustering in retail, digital advertising, and in other domains. In some situations, applying topic modeling to a specific problem can produce unexpected or undesired results because the basic method is unsupervised and a user has no control over which topics are discovered. While some methods have been suggested to introduce prior knowledge into the topic model inference process, these methods generally require extensive labeling of input data (e.g., exhaustive labeling of input documents), extensive changes to the modeling technique (e.g., to introduce structural changes to the topic model), or both. These approaches are difficult to implement and often overly restrictive, and lead to solutions that require longer training time.

SUMMARY

Methods, techniques and mechanisms are disclosed to improve a topic modeling system that tunes a topic model for a set of topics from a corpus of documents. The disclosed methods and techniques allow users to pre-inform the modeling tuning process with bias parameters for desired associations in the topic model. In embodiments, the topic model may be a Latent Dirichlet Allocation (LDA) model. In embodiments, the bias parameter may indicate a fixed association where a particular word in a particular document is associated with a particular topic. In embodiments, the bias parameter may specify a weight value that biases the inference process with regard to a particular association. Advantageously, the disclosed features allow users to specify a small number of parameters to steer the tuning process towards a set of desired topics. As a result, the topic model may be generated more quickly and with more useful topics.

BRIEF DESCRIPTION OF THE DRAWINGS

FIG. 5 illustrates a configuration file specifying example bias parameters that specify fixed associations for a topic model, according to some embodiments.

Figure 1:
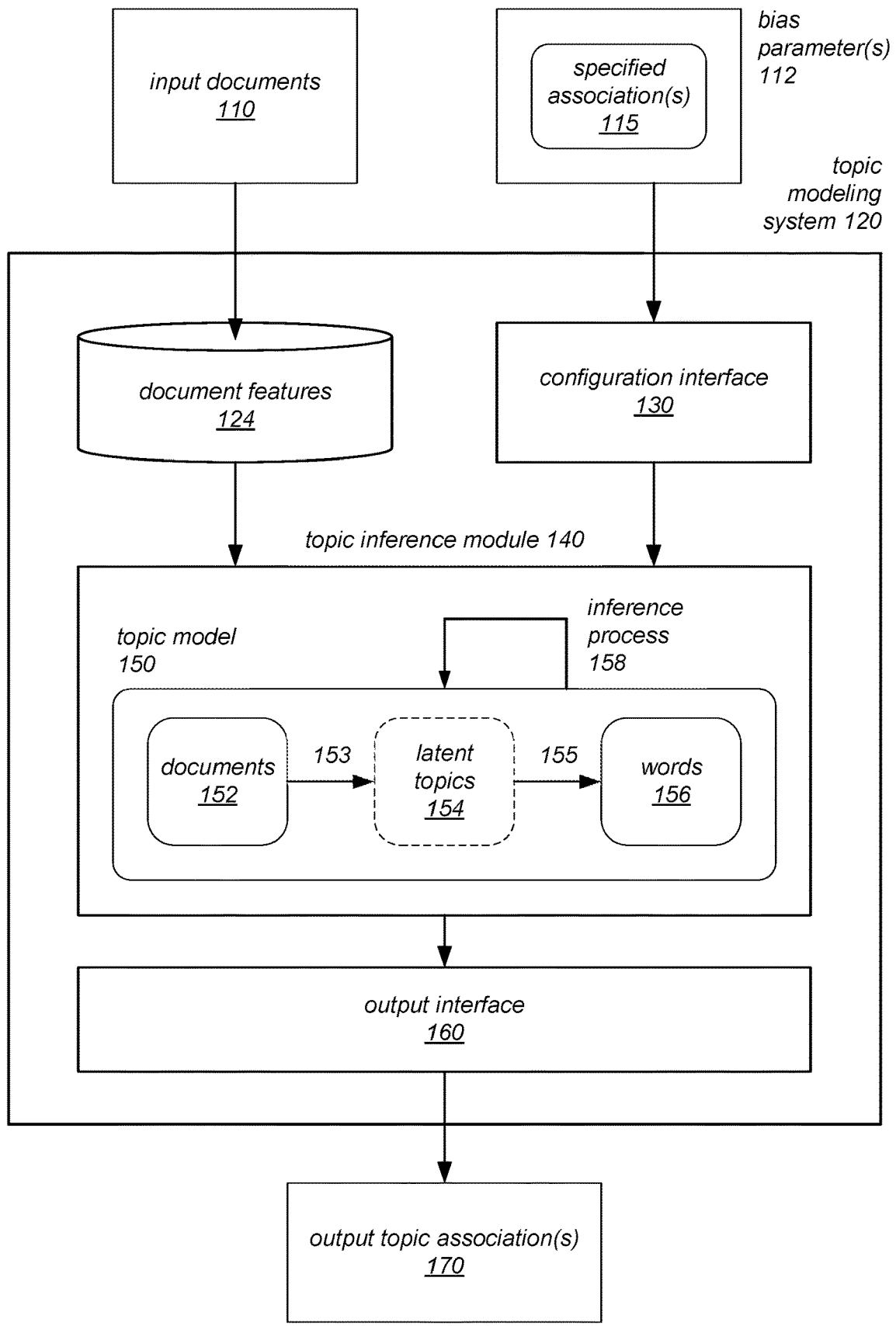
FIG. 1 is a block diagram illustrating a topic modeling system that employs bias parameters for a topic model, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

A topic modeling system is described herein for tuning a topic model for a set of topics from a corpus of documents. The topic modeling system allows users to pre-inform the inference process with bias parameters that indicate desired associations in the topic model. In some embodiments, the topic model may be a Latent Dirichlet Allocation (LDA) model. In some embodiments, the bias parameter may indicate a fixed association where a particular word in a particular document is associated with a particular topic. In embodiments, the bias parameter may specify a weight value that biases the inference process with regard to a particular association. Advantageously, the disclosed features allow users to specify a small number of parameters to steer the inference process towards a set of desired topics. As a result, the topic model may be generated more quickly and with more useful topics.

The disclosed topic modeling system improves conventional topic modeling systems in a number of respects. In a topic modeling process, a statistical model is first designed to capture the properties of interest. Then, from the statistical model, an inference algorithm is derived. In some embodiments, the algorithm may be a Markov chain Monte Carlo (MCMC) algorithm or a variational inference algorithm. In prior modeling systems, the user may influence topic creation by significantly modifying the model itself. For example, one prior approach adds a secondary classification task to the training objective so that the topics assigned to each topic are effective features to classify the document according to a fixed label. Another prior system designates a known label to each topic and multiple labels to each document. These prior techniques require accurate and complete document labels in order to be effective and limit the applicability to semi-supervised domains. However, under the disclosed system and approach, the inference algorithm is modified for a vanilla topic model, to allow users to control topic creation via specific bias parameters, and without significantly changing the structure of the model.

The disclosed system allows the user to express their preference via particular bias parameters that specifies precisely which words in desired documents should correspond to (or not to) a specific topic. In some embodiments, the system allows the user to specify a variety of properties of desired topics to be created. For example, a user may specify that certain words should be associated or not associated with a topic with a specified probability. In some embodiments, the user may specify a hard requirement that a specific word in the corpus should be fixed to a specific topic. Thus, in some embodiments, the user may hard wire data items to co-occur (or not co-occur) in given topics.

In some embodiments, the user's preferences may be expressed using user-supplied weights on the desired data items in affected topics. These weight preferences bias the subsequent topic discovery or inference or model tuning process according to the users imparted knowledge in the weights. In some embodiments, the weights may be used to affect topic sampling and topic discovery to more closely agree with, or incorporate the preferred bias of, the user's preferences. In some embodiments, the user-specified weights may be applied to the sampling distributions used in the inference process to influence the data item topic assignments. These weights can increase, decrease, or maintain the existing probability of specific topics being sampled for, and assigned to, each data item and associated context. Over repeated topic discovery iterations, these influences can also affect the topic sampling and assignment results for other data items and associated contexts. Accordingly, the disclosed bias parameters give the user a flexible spectrum of tools to influence the topic discovery process.

In addition, pre-informing the topic discovery process in this way enables the modeling system to discover desired topics more efficiently. For example, because the specified bias parameters constrain the model space and the inference process, the parameters aid the modeling system to arrive at convergence more quickly, in fewer training iterations. The addition of these bias parameters does not add substantial computational burden or runtime overhead to the topic modeling process and is effective to drive and influence topic creation. These and other benefits and features of the inventive topic modeling systems and methods are discussed in further detail below, in connection with the figures.

FIG. 1 is a block diagram illustrating a topic modeling system that employs bias parameters for a topic model, according to some embodiments. As shown, the figure depicts a topic modeling system 120, which may accept as input a corpus of input documents 110, and one or more bias parameters 112. Based on its inputs, the system outputs an output topic model 170, as shown.

In some embodiments, topic modeling system 120 may implement a document features repository 124, which may be used to store document features from the input documents 110. In some embodiments, these document features may contain words counts from a vocabulary set of the input documents. In some embodiments, the input documents may be preprocessed by the topic modeling system 120, or via another preprocessor, to reduce the input documents to its feature data. For example, in some embodiments, the preprocessor may remove certain words (e.g. words with very high or low frequency in the documents) and combine certain words (e.g. related words with varying verb tense, etc.) before producing the counts. In some embodiments, other metadata may also be generated as part of the document features 124.

As shown, in some embodiments, the topic modeling system 120 may also accept a set of one or more bias parameters 122. In some embodiments, individual ones of the bias parameters 122 may specify a particular model association 115 in the topic model to be inferred. For example, in some embodiments, the topic model may indicate associations between individual words and topics to be inferred, and/or associations between individual documents and topics to be inferred. In some embodiments, these associations may be changed by the topic modeling system 120 during the inference process. In some embodiments, the associations may be associated with a probability, which may indicate the strength or the association in the topic model. In some embodiments, a bias parameter 112 may indicate a user-specified bias either for or against a specified association 115. For example, the bias parameter may specify a bias favoring an association between the word "cat" and a particular latent topic (e.g. topic 12). In some embodiments, the bias parameter may indicate a bias against the association of a document and a particular topic. In some embodiments, the bias parameter may indicate a bias for a particular word and a particular topic, when the word appears in a particular document. In some embodiments, the bias parameter may specify a fixed association, where the specified association is assumed to be a labeled truth by the topic modeling system, and not changed by the topic modeling system during the inference process. In some embodiments, the bias parameter may specify a weight to influence or bias the inference process for or against the specified association. For example, in some embodiments, the specified weight value may be used to alter the sampling of topics when the system is evaluating the specified association.

As shown, in some embodiments, the bias parameters 112 may be received via a configuration interface 130, which may interpret the bias parameters for the topic modeling system. In some embodiments, the configuration interface may be an interface that reads a configuration file, which may specify a number of configuration parameters for a model inference process. In some embodiments, the configuration interface may be a user interface, or a graphical user interface (GUI), which may receive bias parameters as direct user inputs. In some embodiments, the configuration interface may be an application programming interface (API) that receives program requests and/or request parameters. The configuration interface may be tasked with parsing and decoding incoming bias parameters so that they can be used by the topic modeling system during the inference process. In some embodiments, the configuration interface may also receive other control parameters for the inference process, such as the number of latent topics to be generated, or one or more other model hyperparameters.

As shown, in some embodiments, the topic modeling system 120 may implement a topic inference module 140. In some embodiments, the topic inference module may be a usable to generate different types of topic models, according to configuration parameters. As shown, the topic inference module may construct or maintain a state of a topic model 150, which may be modified via an inference process 158. In some embodiments, the topic model 150 may model a number of latent topics 154 using a representation of the documents 152 and a representation of the words 156 in the documents. In some embodiments, each document may be associated 153 with a set of topics with a probability, and each topic may be associated 155 with a set of words with a probability. In some embodiments, these associations and probabilities may be updated during the inference process 158, until a convergence, to produce a topic model with a set of coherent latent topics 154. In some embodiments, the output topic model 170 may indicate one or more matrices that specify the resulting associations and probabilities.

In some embodiments, the topic model 150 may be a latent Dirichlet allocation (LDA) model. LDA topic models may be generated with to infer a set of semantically-coherent topics out of a large corpus of documents, such as documents 110. In some embodiments, each topic may be a latent topic that is not labeled with a semantic name by a user. In some embodiments, each discovered topic may be a unigram language model (i.e. a multinomial probability distribution over the vocabulary from the corpus of documents 110) that describes a set of frequent co-occurring words in the corpus. In some embodiments, the multinomials are drawn from a Dirichlet distribution, which encourages the weight to be concentrated on a small number of words. In the output model 170, each document is represented by a separate multinomial distribution over topics, also drawn from a Dirichlet. In some embodiments, word is generated by drawing a latent topic assignment from the document's distribution, and then a word from the corresponding topic distribution. The Dirichlet priors may be used to provide probabilistic constraints on the topic assignments, encouraging "not too many" topics per document and "not too many" words per topic, but without requiring hard limits for any particular document or topic. Fitting this model to the data, then, is the act of learning the latent topic assignments for each word in the corpus, in a way that balances these priors against the observations.

In some embodiments, the inference process 158 may be performed in accordance with the bias parameters. For example, in some embodiments, the bias parameters may specify a fixed association between a word and a topic or a topic and a document, and the inference process may refrain from updating the model to remove the fixed association. In some embodiments, where the bias parameter specifies a weight value that favors or disfavors a particular association, the inference process may be performed so that particular association is either more likely to remain or more likely to be disrupted. In some embodiments, the inference process 158 may be an unsupervised clustering process, so that the strength of existing associations in the model will tend to attract corroborating associations. For example, in the LDA inference process, words that are semantically related will gradually attract each other. Thus, the particular association specified by the bias parameters may act as initial seeds in the topic model 150. As the topic model 150 evolves during the inference process, the model will develop around the preferences of the user. For example, the user may initially designate one unnamed topic for a particular subject, using a few words and documents, and the inference process will take the initial bias preferences and find other words and documents for the topic. In this manner, the user can provide some control over the direction of the topic model 150 by specifying a small set of initial bias parameters.

In some embodiments, the inference process 158 may stop, once a convergence condition is met. For example, in some embodiments, the inference process may be performed in iterations, and when the changes to the model from one iteration to the next have sufficiently slowed (or stopped), the convergence condition may be deemed to be met. In some embodiments, the changes to the model may be driven by an objective function, and when the objective function is optimized, the convergence condition is reached.

When the inference process stops, the resulting model state may be outputted via an output interface 160. The output interface may be implemented as a textual interface, which may produce text output, for example, to a text file. In some embodiments, the output interface may be implemented as a GUI or an API. As shown, the output interface may output the output topic model. The output topic model may indicate the associations in the topic model 150 and their respective probabilities. In some embodiments, for example where the topic model 150 is an LDA model, the output 170 may specify two matrices. The first matrix may indicate respective probabilities for associations between the words 156 in the model and the topics 154. The second matrix may indicate respective probabilities for associations between the topics 154 and the documents 152. Accordingly, in some embodiments (such as LDA models), a latent topic may be seen as a probability distribution of a set of words, and each document may be seen as a probability distribution over the set of latent topics.

Figure 2:
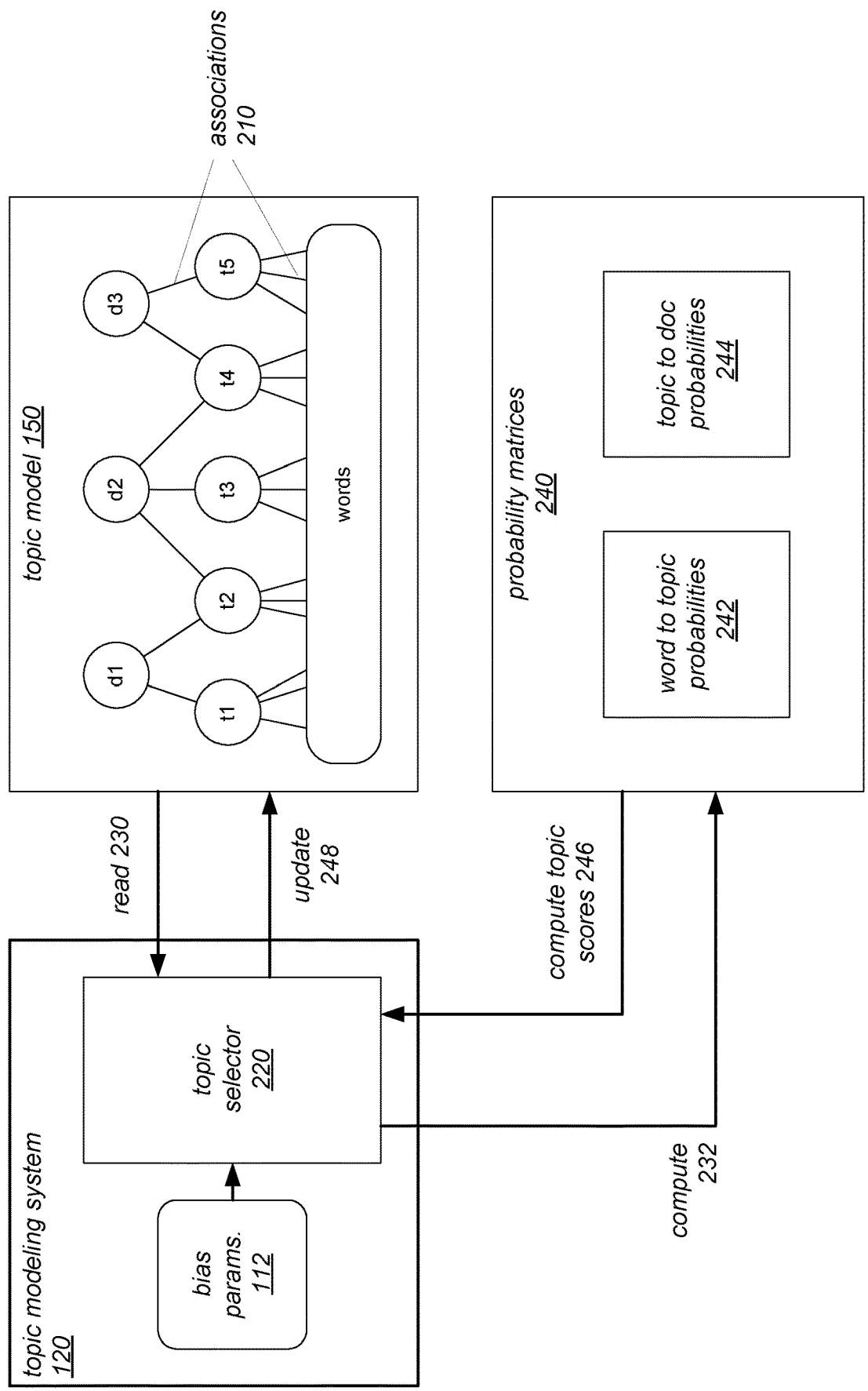
FIG. 2 is a block diagram illustrating a topic sampling and model update process in a topic modeling system that employs bias parameters for a topic model, according to some embodiments.

FIG. 2 is a block diagram illustrating a topic sampling and model update process in a topic modeling system that employs bias parameters for a topic model, according to some embodiments.

As shown, in this figure, topic model system 120 implements a topic select 220, which may be used during the inference process to update the topic model 150. In some embodiments, the depicted process may be performed via a Gibbs sampling technique. As may be understood by those skilled in the art, the Gibbs sampling technique is a Markov chain Monte Carlo (MCMC) algorithm for obtaining a sequence of observations which are approximated from a specified multivariate probability distribution. In this case, the Gibbs sampling technique is used, during iterations of the inference process, to select new topics for a particular word in a particular document.

In some embodiments, (for example, when the topic model is an LDA model), the update process may first read the current state of the topic model 150. As shown, the topic model may include a number of associations 210, from documents to topics, and from topics to words. In some embodiments, the inference process may repeatedly change the topic assigned to each word in a document, to select a new topic that is the most probable for that instance of the word given the current state of the model.

As shown, in some embodiments, a set of probability matrices 240 may be computed 232 from the model state. The matrices may include a word to topic probabilities matrix 242 and a topic to documents probability matrix 244. In some embodiments, these matrices may be generated via counts of the associations currently assigned in the model state. In some embodiments, the counts may be adjusted via Dirichlet priors, which may be used as smoothing parameters.

As shown, next, a set of topic scores may be computed 246 for each topic in the model. In some embodiments, the topic score may be computed based on a product of two probabilities: the probability that the current word belongs to a given topic (based on current counts in the model), and the probability that the current document contains the given topic (based on the current counts). In some embodiments, the topic that has the highest score is then selected by the topic selector 220 to update 248 the association for the word in the document in model. In some embodiments, the new topic is selected using a pseudorandom method, where topics with higher scores are probabilistically favored.

As shown, the specified bias parameters 112 may be used to influence the inference process. In some embodiments, where the bias parameter specified a fixed association, the topic selector 220 may simply skip the update 248 every time it encounters a word and/or document that was specified as a fixed association. Thus, in some embodiments, these fixed associations in the bias parameter remain fixed during the inference or training process. Moreover, because these fixed associations affect the counts in the model and thus the probabilities, they exert a continuing influence on the topic selector throughout the inference process. In some embodiments, where the bias parameter 112 specifies a weight, the weight may be applied during the topic score computation step 246 to influence topic selection. For example, in some embodiments, the weight value may be added to or multiplied to a component of the score calculation, to either increase a topic's score or decrease the topic's score. In some embodiments, the weight may be a negative value, which may reduce a topic's score for a particular association. For example, in some embodiments, the negative weight value may reduce the current association counts obtained from the topic model 150. As may be understood, the bias parameters operation within the existing inference process, and they do not substantially order the inference process or structurally change the model. Rather, the bias parameters only inject certain seeding preferences to the model, which causes the model to develop in a coherent fashion around the seeding preferences.

Figure 3:
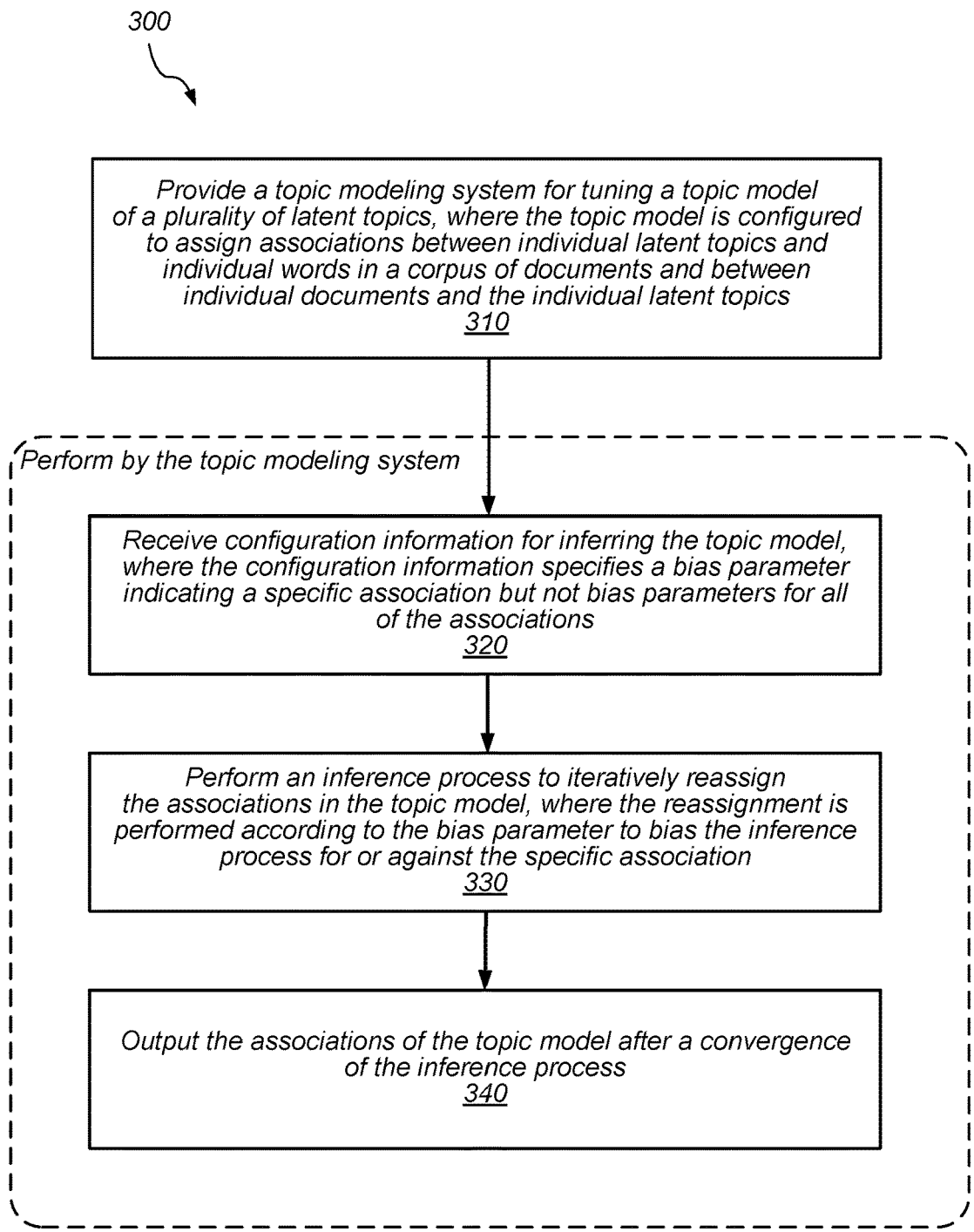
FIG. 3 is a flow diagram illustrating a process of generating a topic model via a topic modeling system that employs bias parameters for the topic model, according to some embodiments.

FIG. 3 is a flow diagram illustrating a process of generating a topic model via a topic modeling system that employs bias parameters for the topic model, according to some embodiments.

The process begins at operation 310, where a topic modeling system is provided for tuning a topic model of a plurality latent topics. In some embodiments, the topic modeling system may be topic modeling system 120, as discussed in connection with FIG. 1. The topic model may assign a set of associations between individual latent topics and individual words in a corpus of documents and between individual documents and the individual latent topics. In some embodiments, the latent topics may be topics 154 of FIG. 1, the documents may be the input documents 110 of FIG. 1, the words may be words 156 of FIG. 1, and the associations may be associations 210 of FIG. 2. In some embodiments, the topic model may be an LDA model, and the inference may be performed according to an LDA algorithm. In some embodiments, the topic may not be latent topics. As shown, the other operations 320, 330, and 340 in the figure is performed by the topic modeling system.

At operation 320, a configuration information is received for tuning the topic model, where the configuration information specifies a bias parameter indicating a specific association. The specified association may be between a word and a topic or between a topic and a document in the corpus. However, the configuration information may not specify bias parameters for all associations in the topic model. In some embodiments, the bias parameter may be bias parameter 112 of FIG. 1, and the specified association may be association 115 of FIG. 1. In some embodiments, the bias parameter may indicate a bias in favor of or against the specified association, so that the inference process may take this bias into account. The bias parameter may specify a fixed association that cannot be changed by the inference process. The bias parameter may specify a weight value to influence a probability of the specified association during the inference process. The bias parameter may be specified as a request parameter, as a configuration parameter in a configuration file, via direct user input, or in another form, depending in the embodiment.

At operation 330, the inference process is performed, where the inference process iteratively reassigns associations in the topic model, and where the reassignment is performed according to the bias parameter to bias the inference process for or against the specified association. As discussed, in some embodiments, the inference process may simply never update a fixed association, in accordance with the bias parameter. In some embodiments, a specified weight value may be used to increase or decrease the probability of a topic during topic selection, which is another form of biasing the topic model. In some embodiments, both types of bias parameters may be specified, and the inference process may be performed according to both types of bias parameters.

At operation 340, the associations of topic model are outputted after convergence of the inference process. As discussed, in some embodiments, convergence may occur when the model state or ceases to substantially change from iteration to iteration. In some embodiments, the inference process may stop on a specified stopping condition. When the process is stopped, the model may be outputted via an output interface, such as interface 160 of FIG. 1. In some embodiments, the output model may be output model 170 of FIG. 1, which may include a representation of the associations and/or probabilities in the converged model. In some embodiments, the representation of the output model may be indicated in two matrices, for example as the probability matrices 240 of FIG. 2.

Figure 4A:
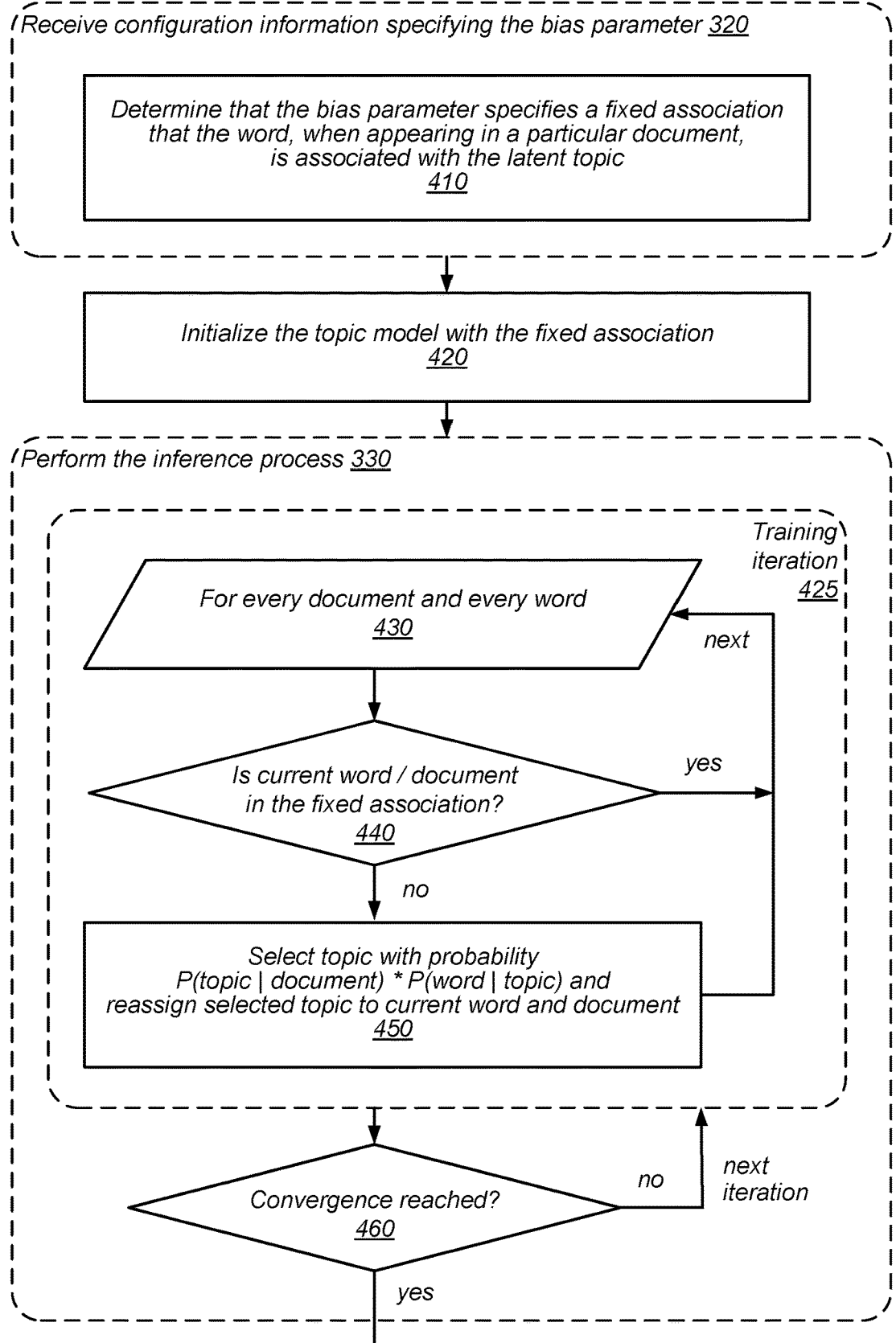
FIG. 4A is a flow diagram illustrating a process of generating a topic model based on a bias parameter that specifies a fixed association in the topic model, according to some embodiments.

FIG. 4A is a flow diagram illustrating a process of generating a topic model based on a bias parameter that specifies a fixed association in the topic model, according to some embodiments. As shown, the depicted process refines certain steps in the process shown on FIG. 3.

As shown, operation 410 provides additional details about operation 320. At operation 410, a determination is made that the bias parameter specifies a fixed association between a word and a latent topic. In this example, the fixed association specifies that the word, when appearing in a particular document, is associated with the specified latent topic.

At operation 420, the topic model is initialized with the fixed association. In some embodiments, in the absence of the bias parameter, the topic model may be initialized randomly. That is, the topic model may simply randomly associate different words and documents with latent topics. However, when the bias parameter is specified in this example, the topic model may be initialized to ensure that the fixed association is set or assigned from the beginning. In this manner, the inference process may be influenced by the specified association in the very first training iteration. In some embodiments, this initialization may be performed by repeatedly exposing the topic model to the association before the inference process, so that the model is preconditioned with the desired association.

The process then proceeds to performing the inference process 330. In this example, the inference process involves an iterative process that proceeds in a series of training iterations 425. As show, the process may continue to repeat until a converge is reached at operation 460.

As shown at operation 430, during each iteration, the inference process may further loop over every word in every document. If the current document and word is not specified by the fixed association, determined at operation 440, the process proceeds to operation 450, where a new topic is selected for the current instance of the word based on a product of two probabilities: the probability of a topic given the current document, and the probability of the current word given the topic. In some embodiments, process may be implemented in a Gibbs sampling technique. In some embodiments, the selection may be performed using a different sampling technique, or using a different scoring formula. In some embodiments, the Gibbs sampling technique essentially allows each topic to pull in words and documents that are closely related to its currently assigned set of words and topics. Over time, the topics will develop over a coherent set of words and documents. As shown, once the new topic is chosen, the new topic is reassigned to the current word in the current document. The process then repeats to a next word in the document, or the next document.

However, if the current document and word is specified by the fixed association at operation 440, the process simply skips operation 450 and proceeds to the next word. Accordingly, the inference process never removed or updates the fixed association. The fixed association specified by the bias parameter is simply accepted as a labeled truth in the model.

Figure 4B:
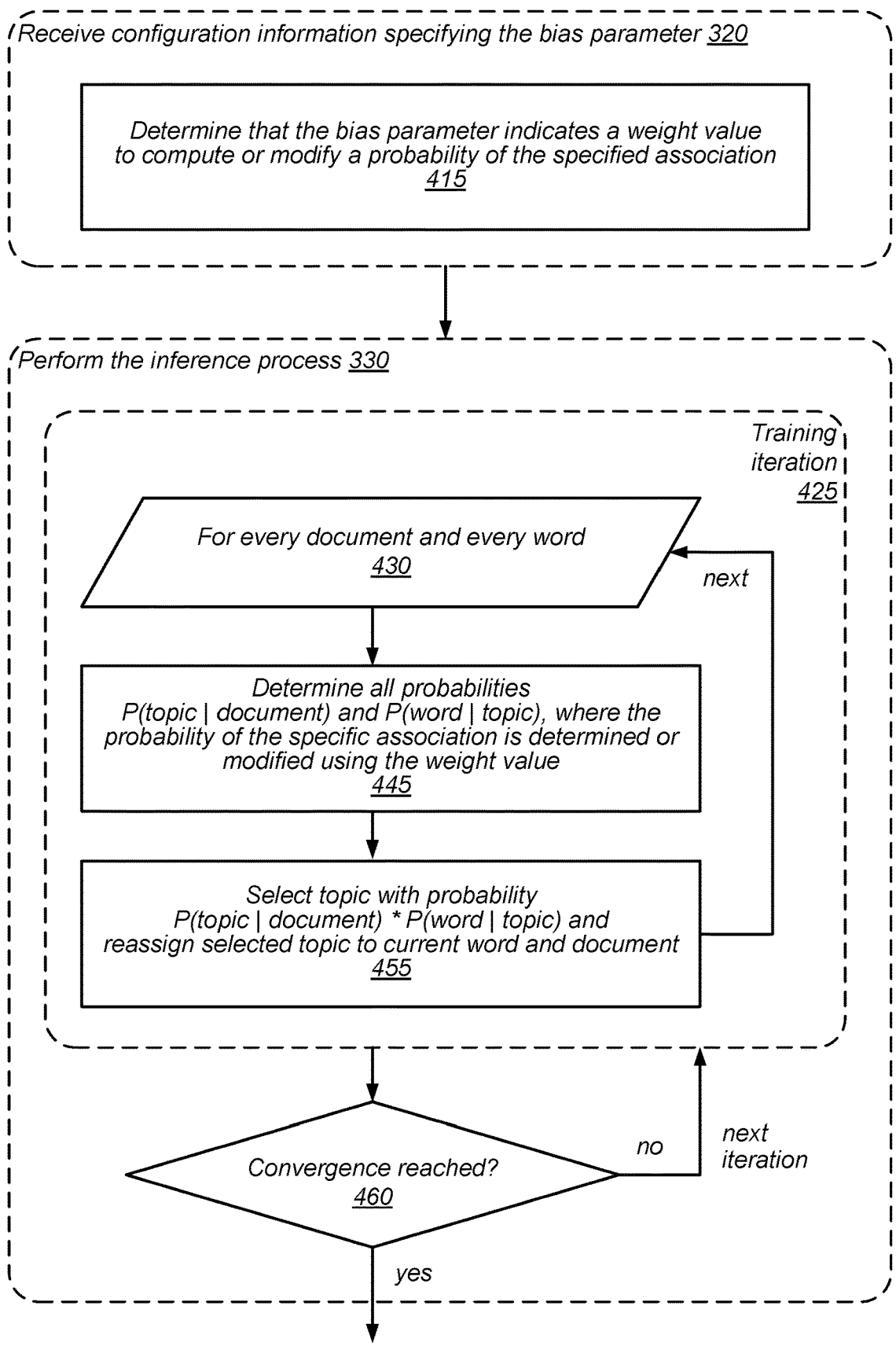
FIG. 4B is a flow diagram illustrating a process of generating a topic model based on a bias parameter that specifies a fixed association in the topic model, according to some embodiments.

FIG. 4B is a flow diagram illustrating a process of generating a topic model based on a bias parameter that specifies a fixed association in the topic model, according to some embodiments. Like the process in FIG. 4A, the depicted process in FIG. 4B also refines certain steps in the process shown on FIG. 3. Moreover, as shown, a number of steps in the FIG. 4B process are the same as the steps in FIG. 4A.

As shown, operation 415 provides additional details about operation 320. At operation 415, a determination is made that the bias parameter indicates a weight value for the specified association. As shown, the weight value is specified to be used to compute or modify a probability of the specified association. It is noted that although operation 420 is not shown in this figure, in some embodiments, the initialization operation 420 may also be performed within the depicted process here, to initialize the specified association in the topic model.

As shown, many of the operations shown for the inference process 330 is the same as in FIG. 4A. However, as shown at operation 445, the probabilities of all topics are determine for P(topic | document) and P(word | topic) are determined. As discussed, these probabilities may be determined from association counts in the current model state, and they may be used to select a new topic for the current word and current document. However, as shown, if the current word and current document matches the specified association, the probability of the association from the current word/document to the specified topic will be computed or modified using the weight value. In some embodiments, the weigh value may simply specify a fixed value for the probability of the specified association. In some embodiments, the weight value may be an additive value in the probability computation, which may be used to, for example, alter the association counts used to compute the probabilities. In some embodiments, the weight value may be a multiplicative value, which may be used to increase or decrease the probability or some component of the probability. In some embodiments, the weight value may specify a negative value, which may be used to reduce the probability of the specified association (e.g., to avoid the specified association in the model).

As shown at operation 455, the process then proceeds to select or assign a new topic based on the product of the two probabilities. In some embodiments, this product may represent a score for a given topic. In some embodiments, the score may be computed differently. In some embodiments, the topic score may be adjusted using Dirichlet priors, which may control how much documents or words can overlap in the topics. In some embodiments, weight value may be applied to the scored, as opposed to the probabilities in operation 445. As may be appreciate by those skilled in the art, the weight value described in process may be implemented in a variety of ways, using a variety of weight values.

FIG. 5 illustrates a configuration file specifying example bias parameters that specify fixed associations for a topic model, according to some embodiments. As shown, in this example, a number of bias parameters 510, 520, 530, and 540 are shown in a configuration file 500. However, as discussed, these types of bias parameters may be specified in a variety of different formats, depending on the embodiment.

As shown, in configuration file 500, the user has designated two latent topic numbers to specific subjects. Topic number 12 is seeded be a topic for "US politics," while topic number 14 is seeded to be a topic for "Washington D.C. travel."

As shown, section 510 specifies a number of fixed associations for different words that appear in the document "Washington newspaper article." In this document, the words "President," "Congress," "Capitol," and "visit" are all to be statically associated with topic number 12. Accordingly, the topic modeling system will not disrupt these associations, but develop the topic model around these fixed associations.

As shown, section 520 specifies a number of fixed associations for different words in the document "Washington Travel Guide." As shown, this list of words includes some of the same words as in section 510. However, in the document "Washington Travel Guide," these words are likely (or known) to indicate a different semantic topic. Accordingly, the two sets of bias parameters 510 and 520 causes the topic modeling system to be very aware, from the beginning of these two distinct topics. In some embodiments, such early "hints" to the topic modeling system will cause the system to generate the model more quickly and correctly.

As shown, bias parameter 530 indicates that the word "election" will always be associated with "election." In this example, the association may occur without reference to any document, because the user is confident that all occurrences of the word across all documents in the corpus should be associated with the topic for "US politics."

As shown, the bias parameter 540 indicates that all words in the document "List of US senator names" should be associated with the topic designated for "US politics." Thus, fixed associations may be specified using only a word, or only a document.

Figure 6:
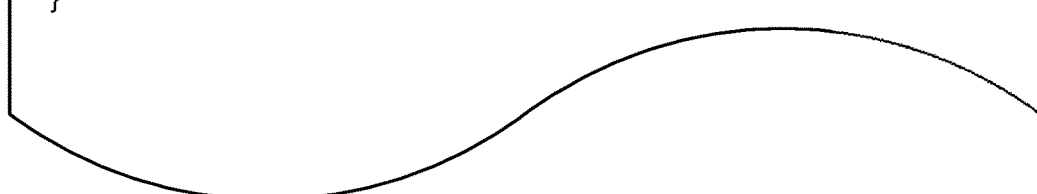
FIG. 6 illustrates a configuration file specifying example bias parameters that specify weights for associations in a topic model, according to some embodiments.

FIG. 6 illustrates a configuration file specifying example bias parameters that specify weights for associations in a topic model, according to some embodiments. As shown, in this example, a number of bias parameters are shown in a configuration file 600. However, as discussed, these types of bias parameters may be specified in a variety of different formats, depending on the embodiment.

As shown, in configuration file 600, bias parameters are organized into topics. In this example, three latent topics ("0," "2," and "9") are shown with bias parameters. Topic section 610 shows the bias parameters specified for topic 0, which is indicated in comment to be designated for "house pets." As shown at line 612, the word "dog" is to be positively biased for this topic. In this example, the bias or weight values are indicated to be a positive or negative value between −1 and 1. For example, these values may be added to 1, and then multiplied to a probability value to adjust that probability value. Thus, a positive weight value here increases the probability, and strengthens the association indicated, and a negative value does the opposite.

At line 614, a negative bias is indicated for "house pets" and the document "Wildlife Magazine article." The user may have specified this bias because this magazine article is known to be mostly about wild animals, and not house pets. Thus, this indicated bias allows the modeling system to recognize this different from the beginning.

At line 616, the word "cat," when appearing in the document "House Cat article," is positively biased to the topic designated for "house pets." Thus, the specified association to a topic may include both a word and a document.

As shown, topic section 620 indicates bias parameters for a topic designated for "African animals." In this example, the words "zebra" and "giraffe" are both positively biased. In some embodiments, this arrangement may be useful to indicate to the topic modeling system that these two words are related for this topic, and a document including both words are likely to be a good association for the topic. Thus, this example illustrates one way of indicating a preference for the co-occurrence of two words.

As shown, topic section 630 indicates bias parameters for a topic designated for "American animals." In this example, the words "bear" is positively biased, and the word "polar" is negatively biased. In some embodiments, this arrangement may be used to indicate that these two words should not appear together in documents associated with the topic. Thus, this example illustrates one way of repelling a word from a topic.

Figure 7:
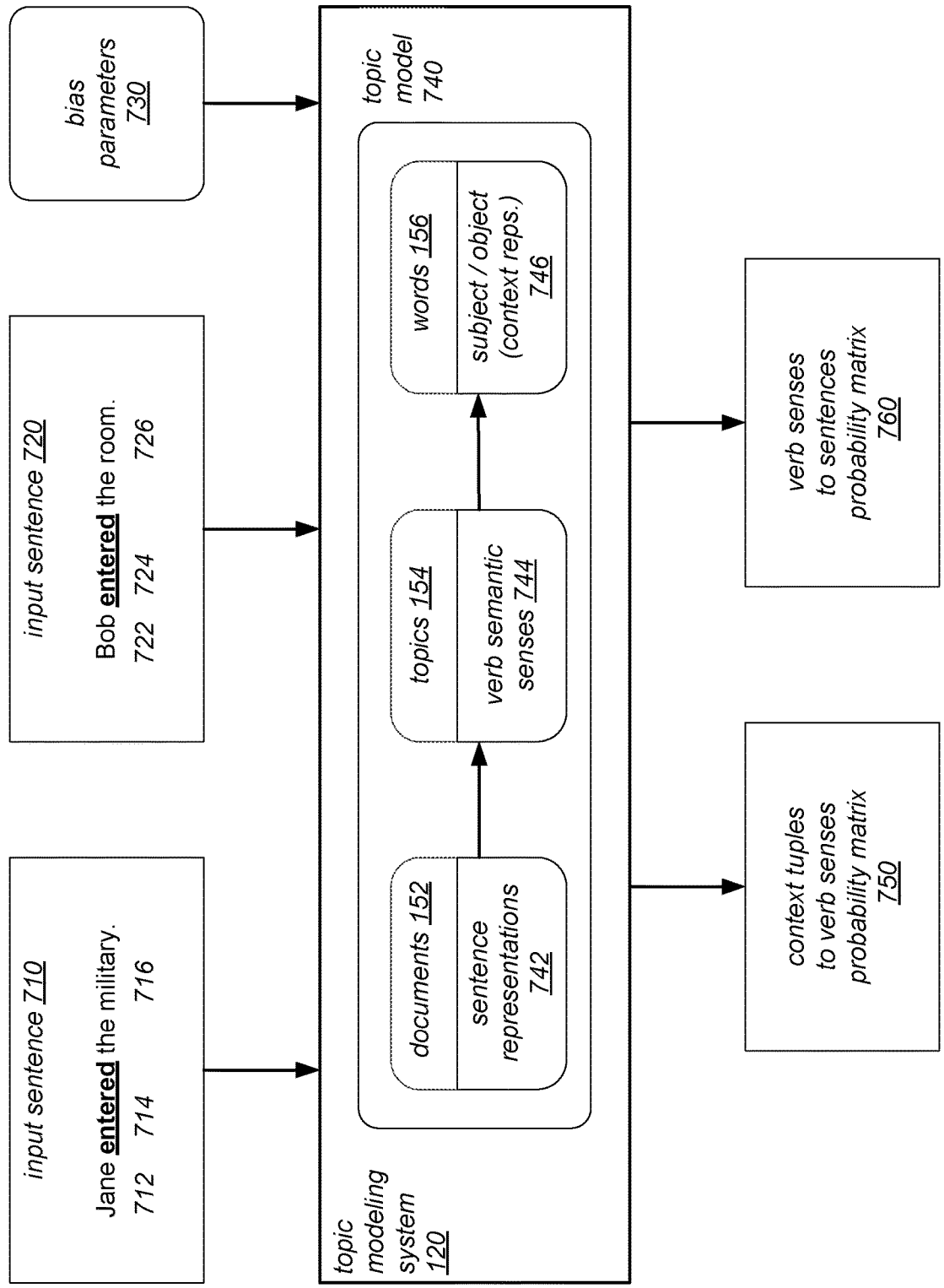
FIG. 7 illustrates an example application of a topic modeling system that uses bias parameters to infer verb senses from sentences, according to some embodiments.

FIG. 7 illustrates an example application of a topic modeling system that uses bias parameters to infer verb senses from sentences, according to some embodiments.

In this particular application of topic modeling, it is recognized that there is a significant link between verb semantics and the allowed syntactic structures for those verbs in sentences. Repositories may be built using topic modeling to association verbs, their context, and their semantic senses. The verb sense classes may prove useful for tasks like semantic role labeling, which is an intermediate task used for systems like machine translation. However, these types of repositories rely on human curation, and are generally lacking coverage. As the resource grows, the task of adding new elements becomes harder, and the long-tail nature of language use means there are many hundreds of thousands of infrequent verbs, verb senses, or verb-particle constructions that may require special handling. This has generated interest in expanding these types of verb sense repositories algorithmically.

Using the bias parameter techniques described herein, a simple, computationally efficient topic modeling process may be built to bias the sampling procedure toward discovering a known subset of verb sense classes. In some embodiments, the topic modeling process may employ Dirichlet-multinomial (D-M) mixtures for both sense induction and clustering. A small number of sentence representations may be labeled with the verb senses, and the sampling may be biased by observing (using the parameters) these labeled sentences in their correct clusters at initialization, and not resampling these initial assignments during the training process. The sampling procedure for all other tokens in the corpus may proceed as normal, so the initialization causes negligible impact on the running time of the algorithm, and allows the sense induction and clustering for all other verbs to proceed unchanged.

It may be demonstrated that this technique aids in the recovery of verb sense classes. The labeled sentence representations may be split into training and test portions, and it may be shown that including partial supervision via bias parameters improves the recovery of verb sense classes by 10% F1 on the test set, and qualitatively improves the semantic coherence of the resulting clusters. It may also be demonstrated that augmenting the model's vocabulary improves verb sense clustering, yielding a 5% increase in F1 score over the state-of-the-art systems on top of the supervision.

As shown, in this application, the input are representations of individual sentence such as sentences 710 and 720. These sentences may have verbs 714 and 724, and respective subjects 712 and 722 and direct objects 716 and 726. As may be understood, the verb "enter" may have multiple verb senses, depending on the context. In sentence 710, the verb "entered" may have a semantic sense similar to "join." In sentence 720, the verb may have a semantic sense "go inside." In this application, a topic modeling system such as system 120 may be used to cluster observations of "words" (in this case subject/object or context representations or tuples 746) and associate these observations to "topics," which are the verb sense classes 744. The sentence representations 742 may be seen as the documents. Accordingly, the topic modeling system 120 may be used to infer a topic model 740, as shown, and output a presentation of the model in two matrices 750 and 760. Matrix 750 may provide the probabilities that different context representations or tuples (e.g. subject/object pairs) imply a particular verb sense. Matrix 760 may provide the probabilities that different verb senses appear in an input sentence. As shown, this inference process may be sped up and controlled via bias parameters 730. Thus, with only a small sample of labeled sentence representations and context representation or tuples, the verb sense model may be vastly improved in a shorter training time.

In some embodiments, the verb sense building process may use D-M mixtures or closely-related Dirichlet Process mixtures to capture semantically coherent clusters from the data. The verb sense model may rely on a dependency-parsed corpus. In some embodiments, the process may capture verb polysemy by clustering sentence representations with different meanings into different senses. Each verb may have its sentence representations clustered into senses independently, learning topic distributions over a vocabulary of subject/direct object pairs. A second mixture model may then be used to clusters learned senses across verbs (e.g., linking the "Bob entered a room" sense to "go inside" and the "Jane entered the military" sense to "join." The clustering step may use topics over context tuple features because abstracting away from the tokens helps recover verb sense classes. In some embodiments, D-M mixtures work for both steps of this process, and can produce state-of-the-art results.

In some embodiments, the topic model may be guided with bias parameters so that its learned topics closely match existing verb classes. For example, in some embodiments, the process may explicitly observe some sentences that have a labeled verb sense class. If the labels span C classes, the modeling process may use a minimum of C topics, and assign each verb sense class $c_i$ to a topic $k_i$. When initializing the topic model, the modeling process normally assign each sentence to a random topic, and update the statistics for the Gibbs sampler, which repeatedly updates these topic assignments until convergence. However, using bias parameters, the modeling process can initialize the topic model by explicitly observing some labeled sentences, and assign each sentence with class $c_i$ to topic $k_i$, and these assignments may be left fixed throughout sampling. All unlabeled data may then be treated normally during the training process, at initialization and during sampling.

In some embodiments, verbs with labeled sentences are biased to participate in the correct verb sense classes, and the topics are biased to contain the vocabulary items corresponding to those same classes. In some embodiments, the weight of the bias may be tuned by observing each labeled sentence w times, because there are orders of magnitude more unlabeled data than labeled, but once the sufficient statistics are initialized there need be no further changes to the sampling algorithm.

Accordingly, the disclosed technique to use bias parameters allows the user to specify partial information about verb sense classes, to help the model conform to this prior knowledge, without requiring an exhaustive specification. Because it does not require any change to the training objective, it creates negligible computational burden. It uses the labeled examples we have, but allows the model room to discover novel classes and novel verb senses, as required to fit the unlabeled data. These are strong advantages over existing work, and subsequent studies confirm that the process can be surprisingly effective in producing coherent models.

During one study, a set of labeled verb sense classes from Semlink were obtained for sentences in the Penn Treebank's Wall Street Journal corpus. To evaluate whether a small number of labels can improve the senses learned from LDA, the annotation was split into a training portion and a test portion. The split was designed to evaluate two separate questions. First, could partial supervision of a verb sense class improve the recovery of that class from the topic model? Second, could supervision of some known classes aid the recovery of other classes? To evaluate both these concerns, the data was first split by verb sense class, using ⅔ of the classes as training and ⅓ for testing. The data was then split by verb, keeping ⅔ for training and ⅓ for testing. Only examples from the 141 most frequent verbs in Semlink were used. The labeled sentences for these examples spanned 148 verb sense classes. This training/test split produced 6400 sentences with known labels for training and 6500 for testing.

The primary source of data for the study came from Gigaword and the Wall Street Journal sections of the Penn Treebank. Both are licensed through the Linguistic Data Consortium. Gigaword is tokenized and dependency parsed automatically as a preprocessing step. Each "document" in LDA is the set of syntactic dependencies observed for a particular verb in a particular sentence. The "words" in the document are either syntactic slot labels (slot, e.g., "subject," "direct object"), or the concatenation of the syntactic slot and the lexical item observed (slot:token, e.g., "subject is John," "direct object is river"). The best model, empirically from the study, uses both sets of vocabulary together, effectively counting each token twice (once with, and once without, the corresponding lexical item).

When training in the supervised setting, the 6400 sentences with known labels were used and each label was assigned to a particular topic. These assignments are never re-sampled, so throughout sampling, the supervised verb has some higher-than-random probability mass assigned to the designated topics and the topics always have some higher-than-random probability mass assigned to the associated vocabulary items. Because Gigaword is much larger than our supervision set, a hyperparameter was included to increase the weight of these labeled instances. Effectively, the known sentences were labeled as though the model has seen them all many time.

Once a model is trained, each test sentence was assigned to its maximum a posteriori topic and all sentences assigned the same topic were treated as belonging to the same cluster. Following the conventions in the literature, standard clustering metrics are used in the report (see Table below). The purity (mPU) is analogous to the precision and it measures how well the model distinguishes the different classes in the evaluation set. The inverse purity (iPU) is analogous to recall and it measures how completely the clusters in the evaluation set are recovered. The harmonic mean of these two measures (F1) is a good measure of how closely the two clusterings align. All three scores are between 0 and 1 with 1 being a perfect recovery; they are reported as percentages between 0 and 100. It is clear from the evaluation results that the partial supervision provided by the bias parameters has improved the clustering. The improvement in quality from a relatively small amount of labeled data is promising for development of verb sense resources for specific domains, or in other languages, and may actually give annotators tools to improve existing verb sense repositories.

TABLE 1

Clustering accuracy (percentage) on verbs in the test set

| Model | Vocabulary | mPU | iPU | F1 |
|---|---|---|---|---|
| LDA | slot:token | 56.08 | 38.58 | 45.71 |
| LDA | slot + slot:token | 59.68 | 42.32 | 49.49 |
| "supervised" LDA | slot:token | 60.42 | 46.49 | 52.54 |
| "supervised" LDA | slot + slot:token | 61.37 | 59.06 | 60.20 |

Figure 8:
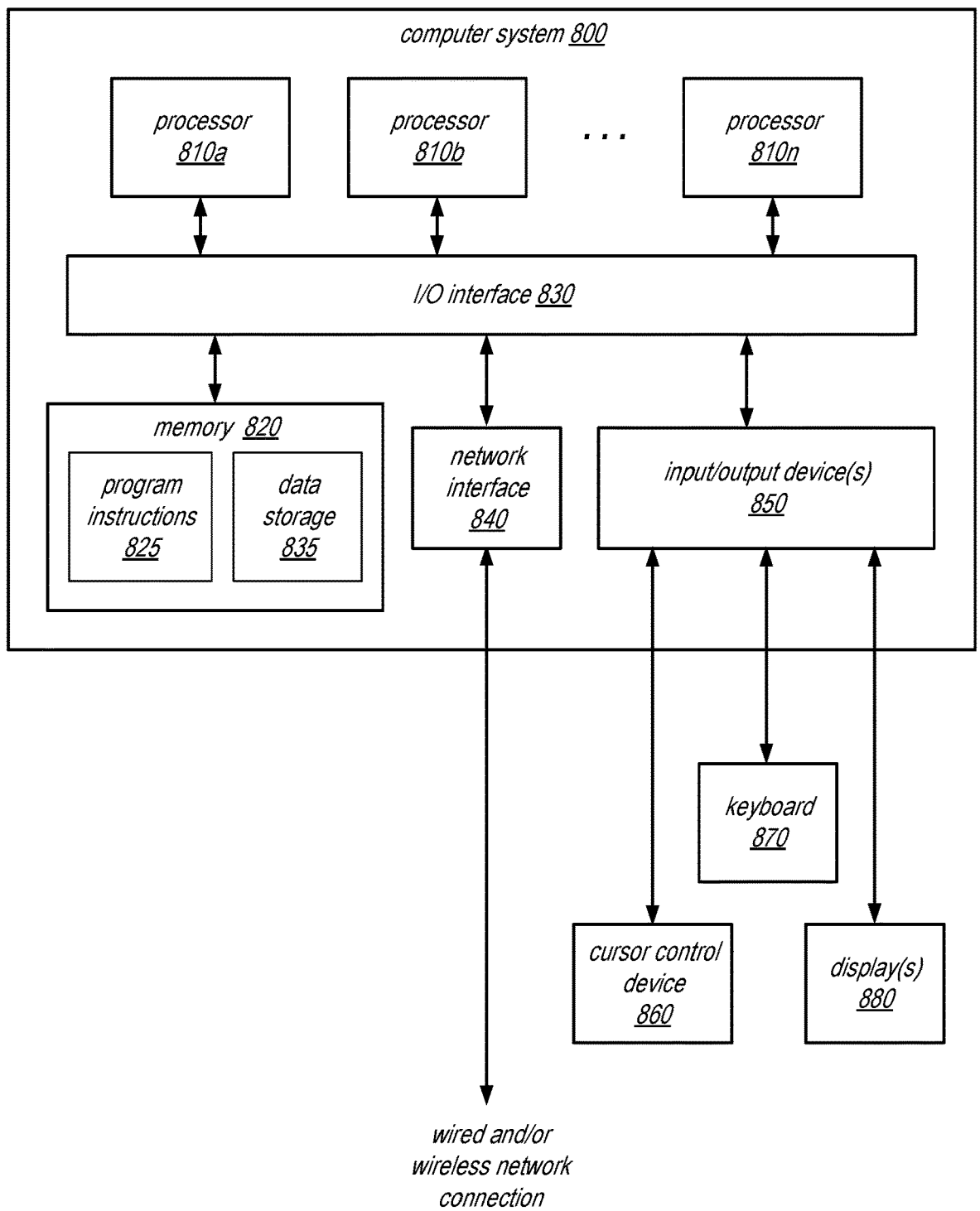
FIG. 8 is a block diagram illustrating a computer system that may be used to implement one or more portions of a topic modeling system that employs bias parameters for a topic model, according to some embodiments.

Various computer systems may be used to implement components of embodiments of the techniques and methods described herein for implementing the topic modeling system. One such computer system or computing device is illustrated by FIG. 8. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some embodiments, it is contemplated that embodiments may be implemented using a single instance of computer system 800, while in other embodiments multiple such systems, or multiple nodes making up computer system 800, may be configured to host different portions, components, or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s).

System memory 820 may be configured to store program instructions and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of methods for providing enhanced accountability and trust in distributed ledgers including but not limited to methods for processing distributed ledger messages as a sender node and/or as a receiver node as illustrated in FIGS. 2 through 6, are shown stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 825, configured to implement embodiments of the methods for providing enhanced accountability and trust in distributed ledgers, and data storage 835, comprising various data accessible by program instructions 825. In one embodiment, program instructions 825 may include software elements of embodiments of the methods for providing enhanced accountability and trust in distributed ledgers, as illustrated in the above Figures. Data storage 835 may include data that may be used in embodiments. In other embodiments, other or different software elements and data may be included.

Those skilled in the art will appreciate that computer system 800 is merely illustrative and is not intended to limit the scope of the methods for providing enhanced accountability and trust in distributed ledgers as described herein. In particular, the computer system and devices may include any combination of hardware or software that can perform the indicated functions, including computers, network devices, internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Figure 9:
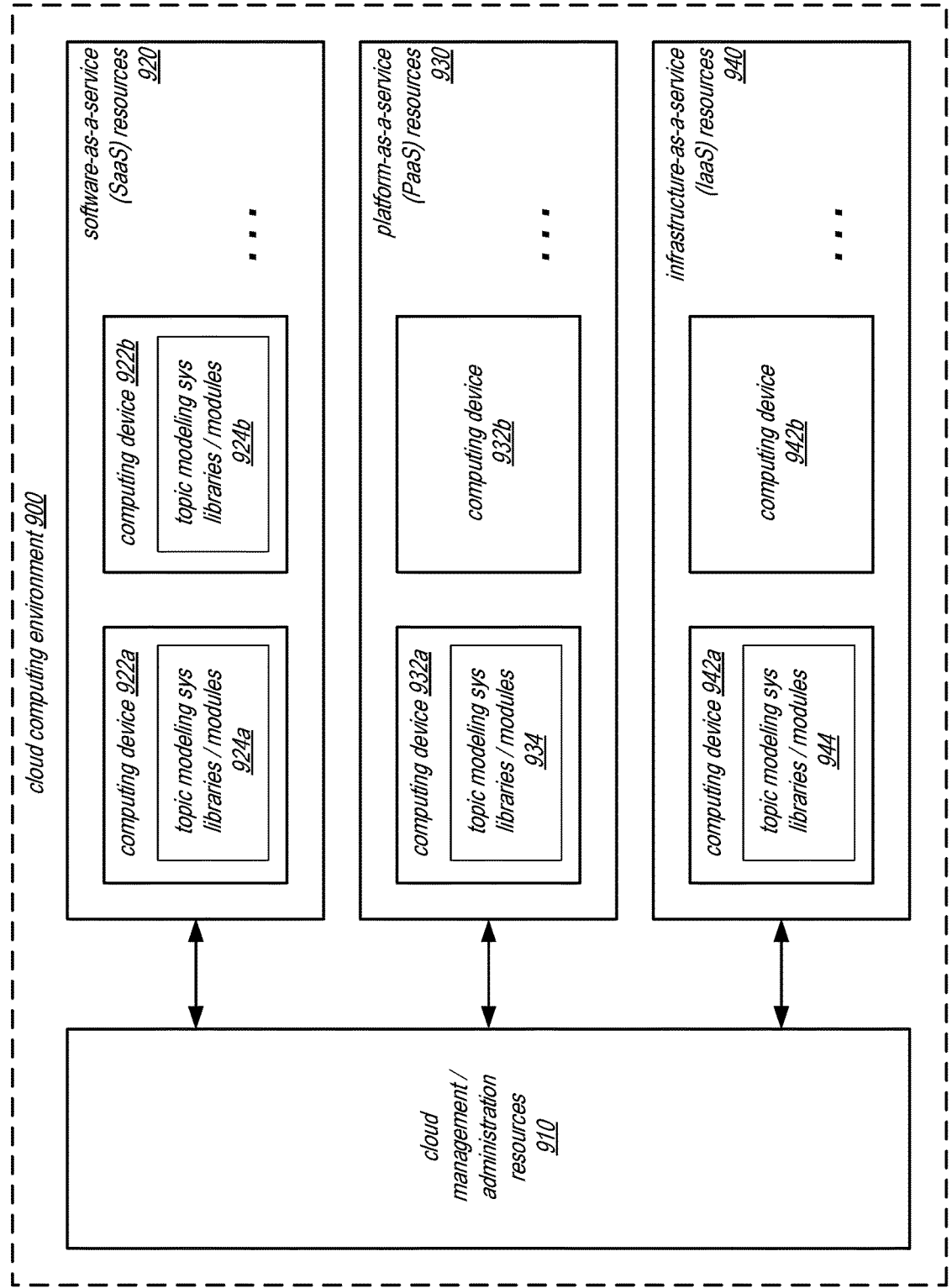
FIG. 9 illustrates an example cloud computing environment in which a topic modeling system that uses bias parameters may be implemented, according to some embodiments.

FIG. 9 illustrates an example cloud computing environment in which a topic modeling system that uses bias parameters may be implemented, according to some embodiments.

As shown, cloud computing environment 900 may include cloud management/administration resources 910, software-as-a-service (SaaS) resources 920, platform-as-a-service (PaaS) resources 930 and/or infrastructure-as-a-service (IaaS) resources 940. Individual ones of these subcomponents of the cloud computing environment 900 may include a plurality of computing devices (e.g., devices similar to device 800 shown in FIG. 8) distributed among one or more data centers in the depicted embodiment, such as devices 922a, 922b, 932a, 932b, 942a, and 942b. A number of different types of network-accessible services, such as database services, customer-relationship management services, machine learning services and the like may be implemented using the resources of the cloud computing environment in various embodiments.

In the depicted embodiment, clients or customers of the cloud computing environment 900 may choose the mode in which they wish to utilize one or more of the network-accessible services offered. For example, in an IaaS mode, in some embodiments, the cloud computing environment may manage virtualization, servers, storage and networking on behalf of the clients, but the clients may have to manage operating systems, middleware, data, runtimes, and applications. If, for example, a client wishes to use IaaS resources 940 for some desired application for which topic modeling systems of the kind described above (e.g. topic modeling system 120) are used, the clients may identify one or more virtual machines implemented using computing devices 942 (e.g., 942a or 942b) as the platforms on which the applications are being run, and ensure that the appropriate topic modeling system libraries and/or modules 944 are installed and available on those virtual machines. In some embodiments, in a PaaS mode, clients may be responsible for managing a smaller subset of the software/hardware stack in various embodiments: e.g., while the clients may still be responsible for application and data management, the cloud environment may manage virtualization, servers, storage, network, operating systems as well as middleware. Topic modeling system libraries/modules such as libraries and/or modules 934 may be pre-deployed to, and run at, at least some PaaS resources (e.g., 932a, 932b, etc.) for applications on various clients in different embodiments. In some embodiments, in a SaaS mode, the cloud computing environment may offer applications as a pre-packaged service (including the topic modeling system components such as 924a and/or 924b), managing even more of the software/hardware stack in various embodiments. For example, clients in a SaaS mode may not even have to explicitly manage applications or data.

In some embodiments, the administration resources 910 may perform resource management-related operations (such as provisioning, network connectivity, ensuring fault tolerance and high availability, and the like) for all the different modes of cloud computing that may be supported in some embodiments. Clients may interact with various portions of the cloud computing environment 900 using a variety of programmatic interfaces in different embodiments, such as a set of APIs (application programming interfaces), web-based consoles, command-line tools, graphical user interfaces and the like. Note that other modes of providing services at which the topic modeling system as described above may be supported in at least some embodiments, such as hybrid public-private clouds, and the like.

The various methods as illustrated in the figures and described herein represent examples of embodiments of methods. The methods may be implemented in software, hardware, or a combination thereof. The order of the methods may be changed, and various elements may be added, reordered, combined, omitted, modified, etc.

Although the embodiments above have been described in considerable detail, numerous variations and modifications will become apparent to those skilled in the art once the above disclosure is fully appreciated. In addition, although this disclosure describes particular types of topic models, model designs, and training techniques, it should be understood that these details may be implemented differently in other embodiments and contexts, and in some instances optional. In general, the teachings of this disclosure are provided in terms of examples, which are used to explain the inventive concepts presented herein. These examples do not limit the inventive concepts.

What is claimed:

1. A system, comprising:
one or more processors with associated memory that implement a topic modeling system configured to:
receive configuration information for tuning a topic model including a plurality of topics, wherein:
the topic model is configured to assign a plurality of associations between individual topics and individual features in a corpus of documents and between individual documents and the individual topics, and
the configuration information specifies at least one bias parameter indicating at least one specified association of the plurality of associations between a particular feature and a particular topic or between a particular document in the corpus and a particular topic, wherein the configuration information does not specify bias parameters for all of the plurality of associations;
perform an inference process to iteratively reassign the associations in the topic model, wherein the reassignment is performed according to the bias parameter to bias the inference process for or against the specified association; and
output the plurality of associations of the topic model after a convergence of the inference process.

2. The system of claim 1, wherein the topic model comprises a Latent Dirichlet Allocation (LDA) topic model and the inference process employs a Gibbs sampling technique to select topics to reassign for individual features and individual documents.

3. The system of claim 1, wherein the specified association is a fixed association that associates the particular feature, when appearing in a particular document, with the particular topic, and wherein the inference process does not change the fixed association.

4. The system of claim 1, wherein the topic modeling system is configured to, during individual iterations of inference process:
determine respective probabilities of the associations in the topic model, wherein a probability of the specified association is determined based at least in part on the bias parameter; and
select a new topic to reassign to a current feature in a current document based at least in part on the probabilities of the associations.

5. The system of claim 4, wherein the bias parameter is a negative weight value that reduces the probability of the specified association during the inference process.

6. The system of claim 1, wherein individual ones of the documents are representations of individual sentences, individual ones of the topics are distinct semantic senses of verbs in the sentences, and individual ones of the features are distinct context representations of the verbs.

7. A computer-implemented method, comprising:
receiving configuration information for tuning a topic model having a plurality of topics, wherein:
the topic model is configured to assign a plurality of associations between individual topics and individual features in a corpus of documents and between individual documents and the individual topics, and
the configuration information specifies at least one bias parameter indicating at least one specified association of the plurality of associations between a particular feature and a particular topic or between a particular document in the corpus and a particular topic, wherein the configuration information does not specify bias parameters for all of the plurality of associations;
performing an inference process to iteratively reassign the associations in the topic model, wherein the reassignment is performed according to the bias parameter to bias the inference process for or against the specified association; and
outputting the plurality of associations of the topic model after a convergence of the inference process.

8. The method of claim 7, wherein the topic model comprises a Latent Dirichlet Allocation (LDA) topic model and the inference process employs a Gibbs sampling technique to select topics to reassign for individual features and individual documents.

9. The method of claim 7, wherein the specified association indicates a fixed association, and wherein the inference process does not change the fixed association.

10. The method of claim 7, wherein the specified association associates the particular feature with the particular topic, when the particular feature appears in a particular document.

11. The method of claim 7, wherein performing the inference process comprises performing, during individual iterations of inference process:
determining respective probabilities of the associations in the topic model, wherein the bias parameter is a weight value used to compute or modify a probability of the specified association; and
selecting a new topic to reassign to a current feature in a current document based at least in part on the probabilities of the associations.

12. The method of claim 11, wherein the weight value is a negative value that reduces the probability of the specified association during the inference process.

13. The method of claim 7, wherein individual ones of the features comprise individual words.

14. The method of claim 7, wherein at least some of the topics are latent topics.

15. The method of claim 7, wherein individual ones of the documents are representations of individual sentences, individual ones of the topics are distinct semantic senses of verbs in the sentences, and individual ones of the features are distinct context representations of the verbs.

16. The method of claim 7, wherein the configuration information specifies a plurality of bias parameters for the particular topic, wherein the plurality of bias parameters specify a bias against at least two features from being associated together to the particular topic.

17. The method of claim 7, wherein the receiving of the configuration information, the performing of the inference process, and the outputting of the associations are performed via a topic modeling service hosted in a cloud computing environment.

18. One or more non-transitory computer-accessible storage media storing program instructions that when executed on or across one or more processors implementing a topic modeling system, cause the topic modeling system to:
receive configuration information for tuning a topic model having a plurality of topics, wherein:
the topic model is configured to assign a plurality of associations between individual topics and individual features in a corpus of documents and between individual documents and the individual topics, and
the configuration information specifies at least one bias parameter indicating at least one specified association of the plurality of associations between a particular feature and a particular topic or between a particular document in the corpus and a particular topic, wherein the configuration information does not specify bias parameters for all of the plurality of associations;
perform an inference process to iteratively reassign the associations in the topic model, wherein the reassignment is performed according to the bias parameter to bias the inference process for or against the specified association; and
output the plurality of associations of the topic model after a convergence of the inference process.

19. The one or more non-transitory computer-accessible storage media of claim 18, wherein the specified association is a fixed association that associates the particular feature, when appearing in a particular document, with the particular topic, and wherein the program instructions when executed on or across the one or more processors causes the topic modeling system to perform the inference process without changing the fixed association.

20. The one or more non-transitory computer-accessible storage media of claim 18, wherein the program instructions when executed on or across the one or more processors causes the topic modeling system to perform, during individual iterations of the inference process:

determine respective probabilities of the associations in the topic model, wherein the bias parameter is a weight value used to compute or modify a probability of the specified association; and select a new topic to reassign to a current word in a current document based at least in part on the probabilities of the associations.

* * * * *